United States Patent
An

(10) Patent No.: US 10,460,681 B2
(45) Date of Patent: Oct. 29, 2019

(54) METHOD AND APPARATUS FOR ADJUSTING GRAY-SCALE CHROMATIC ABERRATION FOR DISPLAY PANEL AND DISPLAY DEVICE

(71) Applicants: BOE Technology Group Co., Ltd., Beijing (CN); Beijing BOE Optoelectronics Technology Co., Ltd., Beijing (CN)

(72) Inventor: Na An, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 138 days.

(21) Appl. No.: 15/654,995

(22) Filed: Jul. 20, 2017

(65) Prior Publication Data
US 2018/0033380 A1    Feb. 1, 2018

(30) Foreign Application Priority Data

Aug. 1, 2016 (CN) .......................... 2016 1 0622207

(51) Int. Cl.
*G09G 3/36* (2006.01)
*G06T 7/00* (2017.01)
(Continued)

(52) U.S. Cl.
CPC ........... *G09G 3/3607* (2013.01); *G06T 7/001* (2013.01); *G09G 3/006* (2013.01); *G06T 7/11* (2017.01);
(Continued)

(58) Field of Classification Search
CPC ... G06T 7/0002; G06T 7/0004; G06T 7/0006; G06T 7/0008; G06T 7/001; G06T 7/11; G09G 3/006
See application file for complete search history.

(56) References Cited

U.S. PATENT DOCUMENTS

| 8,184,077 B2 | 5/2012 | Lee et al. |
| 2004/0125063 A1 | 7/2004 | Lee et al. |

(Continued)

FOREIGN PATENT DOCUMENTS

| CN | 1845232 A | 10/2006 |
| CN | 101075428 A | 11/2007 |

(Continued)

OTHER PUBLICATIONS

First Office Action, for Chinese Patent Application No. 201610622207. 1, dated Jan. 31, 2018, 20 pages.

*Primary Examiner* — Roy P Rabindranath
(74) *Attorney, Agent, or Firm* — Westman, Champlin & Koehler, P.A.

(57) ABSTRACT

The embodiments of the present disclosure provide a method and apparatus for adjusting gray-scale chromatic aberration for a display panel, as well as a display device. The method comprises: inputting a data signal of a test picture to sub-pixels of the display panel, for causing the display panel to display the test picture; collecting optical parameters of respective regions in the test picture; comparing the optical parameter of each region in the test picture with an optical parameter of a standard picture; and adjusting the data signal inputted to the sub-pixels, such that a difference between the optical parameter of each region in the test picture and the optical parameter of the standard picture falls within a predetermined range. The optical parameter comprises a color coordinate and its corresponding brightness.

13 Claims, 9 Drawing Sheets

(51) Int. Cl.
  *G09G 3/00* (2006.01)
  *G06T 7/11* (2017.01)
  *G06T 7/90* (2017.01)

(52) U.S. Cl.
  CPC ...... *G06T 7/90* (2017.01); *G06T 2207/30121* (2013.01); *G09G 2320/0666* (2013.01); *G09G 2320/0673* (2013.01)

(56) References Cited

U.S. PATENT DOCUMENTS

2014/0292792 A1  10/2014  Chen et al.
2015/0187288 A1* 7/2015  Chen .................. G09G 3/3607
                                                    345/690

FOREIGN PATENT DOCUMENTS

| CN | 101339736 A | 1/2009 |
| CN | 101800041 A | 8/2010 |
| CN | 103065609 A | 4/2013 |
| CN | 103761948 A | 4/2014 |
| CN | 104200791 A | 12/2014 |
| KR | 100923676 B1 | 10/2009 |

* cited by examiner

| Color Coordinate of Region | Color Coordinate of Standard White Balance Picture | $\Delta X_1 = X-X'$ $\Delta Y_1 = Y-Y'$ | Adjustment Sequence (L255 is a tested brightness corresponding to gray-scale 255, Lmin 255 is a minimum value specified) |
|---|---|---|---|
| X, Y | X', Y' | $\Delta X_1 > 0$ $\Delta Y_1 > 0$ | Adjust the data signal inputted to red sub-pixels to decrease a display proportion of the red sub-pixels in the region, such that $\Delta X_1$ for the region is smaller than a second predetermined threshold |
| | | | Adjust the data signal inputted to green sub-pixels to decrease a display proportion of the green sub-pixels in the region, such that $\Delta Y_1$ for the region is smaller than the second predetermined threshold |
| | | $\Delta X_1 < 0$ $\Delta Y_1 < 0$ | Adjust the data signal inputted to blue sub-pixels to decrease a display proportion of the blue sub-pixels in the region, such that $\Delta X_1$ for the region is smaller than the second predetermined threshold after the adjustment |
| | | | Adjust the data signal inputted to the green sub-pixels to decrease the display proportion of the green sub-pixels in the region, such that $\Delta Y_1$ for the region is smaller than the second predetermined threshold |
| | | $\Delta X_1 > 0$ $\Delta Y_1 < 0$ | Adjust the data signal inputted to the blue sub-pixels to decrease the display proportion of the blue sub-pixels in the region, such that $\Delta Y_1$ for the region is smaller than a third predetermined threshold after the adjustment |
| | | | Adjust the data signal inputted to the red sub-pixels to decrease the display proportion of the red sub-pixels in the region, such that $\Delta X_1$ for the region is smaller than a second predetermined threshold |
| | | | Adjust the data signal inputted to the blue sub-pixels to increase the display proportion of the blue sub-pixels in the region, such that $\Delta X_1$ for the region is smaller than the second predetermined threshold |
| | | $\Delta X_1 < 0$ $\Delta Y_1 > 0$ | Adjust the data signal inputted to the blue sub-pixels to decrease the display proportion of the blue sub-pixels in the region, such that $\Delta X_1$ for the region is smaller than the third predetermined threshold |
| | | | Adjust the data signal inputted to the green sub-pixels to decrease the display proportion of the green sub-pixels in the region, such that $\Delta Y_1$ for the region is smaller than a second predetermined threshold |
| | | | Adjust the data signal inputted to the blue sub-pixels to increase the display proportion of the blue sub-pixels in the region, such that $\Delta X_1$ for the region is smaller than the second predetermined threshold |

Fig. 3

| Color Coordinate of Region | Color Coordinate of Standard White Balance Picture | $\Delta X_2 = M-X'$ $\Delta Y_2 = N-Y'$ | Adjustment Sequence |
|---|---|---|---|
| M, N | X', Y' | $\Delta X_2 > 0$ $\Delta Y_2 > 0$ | Adjust the data signal inputted to the red sub-pixels to decrease the display proportion of the red sub-pixels in the region, such that an abscissa, M, of the gray-scale color coordinate of the region results in a minimum value of $\Delta X_2^2$ and that the brightness corresponding to the gray-scale color coordinate of the region is higher than the predetermined brightness |
| | | | Adjust the data signal inputted to the green sub-pixels to decrease the display proportion of the green sub-pixels in the region, such that an ordinate, N, of the gray-scale color coordinate of the region results in a minimum value of $\Delta Y_2^2$ and that the brightness corresponding to the gray-scale color coordinate of the region is higher than the predetermined brightness |
| | | $\Delta X_2 < 0$ $\Delta Y_2 < 0$ | Adjust the data signal inputted to the blue sub-pixels to decrease the display proportion of the blue sub-pixels in the region, such that the abscissa, M, of the gray-scale color coordinate of the region results in a minimum value of $\Delta X_2^2$ and that the brightness corresponding to the gray-scale color coordinate of the region is higher than the predetermined brightness |
| | | | Adjust the data signal inputted to the green sub-pixels to decrease the display proportion of the green sub-pixels in the region, such that the ordinate, N, of the gray-scale color coordinate of the region results in a minimum value of $\Delta Y_2^2$ and that the brightness corresponding to the gray-scale color coordinate of the region is higher than the predetermined brightness |
| | | $\Delta X_2 > 0$ $\Delta Y_2 < 0$ | Adjust the data signal inputted to the blue sub-pixels to decrease the display proportion of the blue sub-pixels in the region, such that a difference between the ordinate of the gray-scale color coordinate of the region and the ordinate of the color coordinate of the standard picture is smaller than the third predetermined threshold and that the brightness corresponding to the gray-scale color coordinate of the region is higher than the predetermined brightness |
| | | | Adjust the data signal inputted to the red sub-pixels to decrease the display proportion of the red sub-pixels in the region, such that the abscissa, M, of the gray-scale color coordinate of the region results in a minimum value of $\Delta X_2^2$ and that the brightness corresponding to the gray-scale color coordinate of the region is higher than the predetermined brightness |
| | | | Adjust the data signal inputted to the blue sub-pixels to increase the display proportion of the blue sub-pixels in the region, such that the ordinate, N, of the gray-scale color coordinate of the region results in a minimum value of $\Delta Y_2^2$ and that the brightness corresponding to the gray-scale color coordinate of the region is higher than the predetermined brightness |

Fig. 5A

| Color Coordinate of Region | Color Coordinate of Standard White Balance Picture | $\Delta X_2 = M-X'$ $\Delta Y_2 = N-Y'$ | Adjustment Sequence |
|---|---|---|---|
| M, N | X', Y' | $\Delta X_2 < 0$ $\Delta Y_2 > 0$ | Adjust the data signal inputted to the blue sub-pixels to decrease the display proportion of the blue sub-pixels in the region, such that a difference between the abscissa of the gray-scale color coordinate of the region and the abscissa of the color coordinate of the standard picture is smaller than the third predetermined threshold and that the brightness corresponding to the gray-scale color coordinate of the region is higher than the predetermined brightness |
| | | | Adjust the data signal inputted to the green sub-pixels to decrease the display proportion of the green sub-pixels in the region, such that the ordinate, N, of the gray-scale color coordinate of the region results in a minimum value of $\Delta Y_2^2$ and that the brightness corresponding to the gray-scale color coordinate of the region is higher than the predetermined brightness |
| | | | Adjust the data signal inputted to the blue sub-pixels to increase the display proportion of the blue sub-pixels in the region, such that the abscissa, M, of the gray-scale color coordinate of the region results in a minimum value of $\Delta X_2^2$ and that the brightness corresponding to the gray-scale color coordinate of the region is higher than the predetermined brightness |

Fig. 5B

| Color Coordinate of Gray-Scale to Be Adjusted | Color Coordinate of Region | $\Delta X_3 = M-M'$ $\Delta Y_3 = N-N'$ | Adjustment Sequence |
|---|---|---|---|
| M, N | X', Y' | $\Delta X_3 > 0$ $\Delta Y_3 > 0$ | Adjust the data signal inputted to the red sub-pixels to decrease the display proportion of the red sub-pixels in the region in the test picture in which the gray-scale to be adjusted is displayed, such that an abscissa, M', of the color coordinate of the gray-scale to be adjusted results in a minimum value of $\Delta X_3^2$ and that the brightness corresponding to the color coordinate of the gray-scale to be adjusted is higher than the predetermined brightness |
| | | | Adjust the data signal inputted to the green sub-pixels to decrease the display proportion of the red sub-pixels in the region in the test picture in which the gray-scale to be adjusted is displayed, such that an ordinate, N', of the color coordinate of the gray-scale to be adjusted results in a minimum value of $\Delta Y_3^2$ and that the brightness corresponding to the color coordinate of the gray-scale to be adjusted is higher than the predetermined brightness |
| | | $\Delta X_3 < 0$ $\Delta Y_3 < 0$ | Adjust the data signal inputted to the blue sub-pixels to decrease the display proportion of the blue sub-pixels in the region in the test picture in which the gray-scale to be adjusted is displayed, such that the abscissa, M', of the color coordinate of the gray-scale to be adjusted results in a minimum value of $\Delta X_3^2$ and that the brightness corresponding to the color coordinate of the gray-scale to be adjusted is higher than the predetermined brightness |
| | | | Adjust the data signal inputted to the green sub-pixels to decrease the display proportion of the red sub-pixels in the region in the test picture in which the gray-scale to be adjusted is displayed, such that the ordinate, N', of the color coordinate of the gray-scale to be adjusted results in a minimum value of $\Delta Y_3^2$ and that the brightness corresponding to the color coordinate of the gray-scale to be adjusted is higher than the predetermined brightness |

Fig. 6A

| Color Coordinate of Gray-Scale to Be Adjusted | Color Coordinate of Region | $\Delta X_3 = M-M'$ $\Delta Y_3 = N-N'$ | Adjustment Sequence |
|---|---|---|---|
| M, N | X', Y' | $\Delta X_3 > 0$ $\Delta Y_3 < 0$ | Adjust the data signal inputted to the blue sub-pixels to decrease the display proportion of the blue sub-pixels in the region in the test picture in which the gray-scale to be adjusted is displayed, such that a difference between the ordinate of the color coordinate of the gray-scale to be adjusted and the ordinate of the color coordinate of the region is smaller than the third predetermined threshold and that the brightness corresponding to the color coordinate of the gray-scale to be adjusted is higher than the predetermined brightness |
| | | | Adjust the data signal inputted to the red sub-pixels to decrease the display proportion of the red sub-pixels in the region in the test picture in which the gray-scale to be adjusted is displayed, such that the abscissa, M', of the color coordinate of the gray-scale to be adjusted results in a minimum value of $\Delta X_3^2$ and that the brightness corresponding to the color coordinate of the gray-scale to be adjusted is higher than the predetermined brightness |
| | | | Adjust the data signal inputted to the blue sub-pixels to increase the display proportion of the blue sub-pixels in the region in the test picture in which the gray-scale to be adjusted is displayed, such that the ordinate, N', of the color coordinate of the gray-scale to be adjusted results in a minimum value of $\Delta Y_3^2$ and that the brightness corresponding to the color coordinate of the gray-scale to be adjusted is higher than the predetermined brightness |
| | | $\Delta X_3 < 0$ $\Delta Y_3 > 0$ | Adjust the data signal inputted to the blue sub-pixels to decrease the display proportion of the blue sub-pixels in the region in the test picture in which the gray-scale to be adjusted is displayed, such that a difference between the ordinate of the color coordinate of the gray-scale to be adjusted and the ordinate of the color coordinate of the region is smaller than the third predetermined threshold and that the brightness corresponding to the color coordinate of the gray-scale to be adjusted is higher than the predetermined brightness |
| | | | Adjust the data signal inputted to the green sub-pixels to decrease the display proportion of the green sub-pixels in the region in the test picture in which the gray-scale to be adjusted is displayed, such that the abscissa, M', of the color coordinate of the gray-scale to be adjusted results in a minimum value of $\Delta X_3^2$ and that the brightness corresponding to the color coordinate of the gray-scale to be adjusted is higher than the predetermined brightness |
| | | | Adjust the data signal inputted to the blue sub-pixels to increase the display proportion of the blue sub-pixels in the region in the test picture in which the gray-scale to be adjusted is displayed, such that the ordinate, N', of the color coordinate of the gray-scale to be adjusted results in a minimum value of $\Delta Y_3^2$ and that the brightness corresponding to the color coordinate of the gray-scale to be adjusted is higher than the predetermined brightness |

Fig. 6B

METHOD AND APPARATUS FOR ADJUSTING GRAY-SCALE CHROMATIC ABERRATION FOR DISPLAY PANEL AND DISPLAY DEVICE

CROSS-REFERENCE TO RELATED APPLICATION(S)

This application claims priority to Chinese Application No. 201610622207.1, filed on Aug. 1, 2016, incorporated herein by reference in their entirety.

TECHNICAL FIELD

The present disclosure relates to display technology, and more particularly, to a method and apparatus for adjusting gray-scale chromatic aberration for a display panel, as well as a display device.

BACKGROUND

Driving circuits for Liquid Crystal Display (LCD) may include a gate driving circuit, a source driving circuit and a gamma voltage generation unit. The gate driving circuit produces a signal for controlling on/off of a gate line. The gamma voltage generation unit generates a gamma reference voltage and transmits it to the source driving circuit. Based on the received gamma reference voltage, the source driving circuit generates an analog voltage signal corresponding to a gray-scale to be displayed and applies it to a data line. An intersection area of the gate line and the data line corresponds to a sub-pixel. The display brightness of each sub-pixel on the LCD depends on the amplitude of the analog voltage signal applied to the data line corresponding to the sub-pixel. The gamma curve required by a conventional LCD is predetermined. In order to obtain the target gamma curve, the gamma reference voltage of the LCD is also predetermined. However, during the manufacture process, the predetermined gamma curve may not be obtained based on the predetermined gamma reference voltage for various reasons.

SUMMARY

In view of the above, the embodiments of the present disclosure provide a method and apparatus for adjusting gray-scale chromatic aberration for a display panel, as well as a display device.

According to an embodiment of the present disclosure, a method for adjusting gray-scale chromatic aberration for a display panel is provided. The method comprises: inputting a data signal of a test picture to sub-pixels of the display panel, for causing the display panel to display the test picture; collecting optical parameters of respective regions in the test picture; comparing the optical parameter of each region in the test picture with an optical parameter of a standard picture; and adjusting the data signal inputted to the sub-pixels, such that a difference between the optical parameter of each region in the test picture and the optical parameter of the standard picture falls within a predetermined range. The optical parameter comprises a color coordinate and its corresponding brightness.

For example, the display panel comprises n*n regions, where n is an integer larger than 1.

For example, the test picture is a white picture and the standard picture is a white balance picture. The step of adjusting the data signal inputted to the sub-pixels such that the difference between the optical parameter of each region in the test picture and the optical parameter of the standard picture falls within the predetermined range comprises: comparing the color coordinates of the respective regions in the test picture with the color coordinates of the standard picture sequentially; adjusting, when a difference between the color coordinate of any region in the test picture and the color coordinate of the standard picture has an absolute value larger than 0, the data signal inputted to the sub-pixels of the region, such that a difference between the color coordinate of the region and the color coordinate of the standard picture is smaller than a first predetermined threshold and the brightness corresponding to the color coordinate of the region is higher than a predetermined brightness; and terminating the adjustment when a difference between the color coordinate of at least one region in the test picture and the color coordinate of the standard picture has an absolute value larger than the first predetermined threshold.

For example, the step of adjusting the data signal inputted to the sub-pixels of the region comprises:

when $X-X'>0$ and $Y-Y'>0$:
adjusting the data signal inputted to red sub-pixels to decrease a display proportion of the red sub-pixels in the region, such that $X-X'$ for the region is smaller than a second predetermined threshold; and
adjusting the data signal inputted to green sub-pixels to decrease a display proportion of the green sub-pixels in the region, such that $Y-Y'$ for the region is smaller than the second predetermined threshold, when $X-X'<0$ and $Y-Y'<0$:
adjusting the data signal inputted to blue sub-pixels to decrease a display proportion of the blue sub-pixels in the region, such that $X-X'$ for the region is smaller than the second predetermined threshold; and
adjusting the data signal inputted to the green sub-pixels to decrease the display proportion of the green sub-pixels in the region, such that $Y-Y'$ for the region is smaller than the second predetermined threshold, when $X-X'>0$ and $Y-Y'<0$:
adjusting the data signal inputted to the blue sub-pixels to decrease the display proportion of the blue sub-pixels in the region, such that $Y-Y'$ for the region is smaller than a third predetermined threshold;
adjusting the data signal inputted to the red sub-pixels to decrease the display proportion of the red sub-pixels in the region, such that $X-X'$ for the region is smaller than a second predetermined threshold; and
adjusting the data signal inputted to the blue sub-pixels to increase the display proportion of the blue sub-pixels in the region, such that $X-X'$ for the region is smaller than the second predetermined threshold, when $X-X'<0$ and $Y-Y'>0$:
adjusting the data signal inputted to the blue sub-pixels to decrease the display proportion of the blue sub-pixels in the region, such that $X-X'$ for the region is smaller than the third predetermined threshold;
adjusting the data signal inputted to the green sub-pixels to decrease the display proportion of the green sub-pixels in the region, such that $Y-Y'$ for the region is smaller than a second predetermined threshold; and
adjusting the data signal inputted to the blue sub-pixels to increase the display proportion of the blue sub-pixels in the region, such that $X-X'$ for the region is smaller than the second predetermined threshold, where $(X, Y)$ represents the color coordinate of the region in the test picture and $(X', Y')$ represents the color coordinate of the standard picture.

For example, the method further comprises: adjusting, when the difference between the color coordinate of each region in the test picture and the color coordinate of the standard picture has an absolute value smaller than the first predetermined threshold, a gray-scale color coordinate of the test picture.

For example, the step of adjusting the gray-scale color coordinate of the test picture comprises: displaying the test picture at different gray-scales in the respective regions in the display panel; comparing the gray-scale color coordinates of the respective regions in the test picture with the color coordinates of the standard picture sequentially; and adjusting, when a difference between the gray-scale color coordinate of any region in the test picture and the color coordinate of the standard picture has an absolute value larger than 0, the data signal inputted to the sub-pixels of the region, such that the variance between the gray-scale color coordinate of the region and the color coordinate of the standard picture is minimized and the brightness corresponding to the gray-scale color coordinate of the region is higher than the predetermined brightness.

For example, the step of adjusting the data signal inputted to the sub-pixels of the region such that the variance between the gray-scale color coordinate of the region and the color coordinate of the standard picture is minimized and the brightness corresponding to the gray-scale color coordinate of the region is higher than the predetermined brightness comprises:

when $M-X'>0$ and $N-Y'>0$:
adjusting the data signal inputted to the red sub-pixels to decrease the display proportion of the red sub-pixels in the region, such that an abscissa, M, of the gray-scale color coordinate of the region results in a minimum value of $(M-X')^2$ and that the brightness corresponding to the gray-scale color coordinate of the region is higher than the predetermined brightness; and
adjusting the data signal inputted to the green sub-pixels to decrease the display proportion of the green sub-pixels in the region, such that an ordinate, N, of the gray-scale color coordinate of the region results in a minimum value of $(N-Y')^2$ and that the brightness corresponding to the gray-scale color coordinate of the region is higher than the predetermined brightness, when $M-X'<0$ and $N-Y'<0$:
adjusting the data signal inputted to the blue sub-pixels to decrease the display proportion of the blue sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness; and
adjusting the data signal inputted to the green sub-pixels to decrease the display proportion of the green sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness, when $M-X'>0$ and $N-Y'<0$:
adjusting the data signal inputted to the blue sub-pixels to decrease the display proportion of the blue sub-pixels in the region, such that a difference between the ordinate of the gray-scale color coordinate of the region and the ordinate of the color coordinate of the standard picture is smaller than the third predetermined threshold and that the brightness corresponding to the gray-scale color coordinate of the region is higher than the predetermined brightness;
adjusting the data signal inputted to the red sub-pixels to decrease the display proportion of the red sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness; and
adjusting the data signal inputted to the blue sub-pixels to increase the display proportion of the blue sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness, when $M-X'<0$ and $N-Y'>0$:
adjusting the data signal inputted to the blue sub-pixels to decrease the display proportion of the blue sub-pixels in the region, such that a difference between the abscissa of the gray-scale color coordinate of the region and the abscissa of the color coordinate of the standard picture is smaller than the third predetermined threshold and that the brightness corresponding to the gray-scale color coordinate of the region is higher than the predetermined brightness;
adjusting the data signal inputted to the green sub-pixels to decrease the display proportion of the green sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness; and
adjusting the data signal inputted to the blue sub-pixels to increase the display proportion of the blue sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness, where (M, N) represents the gray-scale color coordinate of the region in the test picture and (X', Y') represents the color coordinate of the standard picture.

For example, the step of adjusting the gray-scale color coordinates of the respective regions in the test picture further comprises: displaying the test picture at continuous gray-scales in the respective regions in the display panel; comparing the gray-scale color coordinate of one of the regions in the test picture with predetermined adjacent, continuous color coordinates sequentially; determining a gray-scale to be adjusted, the gray-scale to be adjusted having a maximum absolute difference from the gray-scale color coordinate of the region among the predetermined adjacent, continuous color coordinates; and adjusting, when a difference between the color coordinate of the gray-scale to be adjusted and the gray-scale color coordinate of the region has an absolute value larger than 0, the data signal inputted to the sub-pixels of the region in the test picture in which the gray-scale to be adjusted is displayed, such that the variance between the color coordinate of the gray-scale to be adjusted and the gray-scale color coordinate of the region is minimized and the brightness corresponding to the region in the test picture in which the gray-scale to be adjusted is displayed is higher than the predetermined brightness.

For example, the step of adjusting the data signal inputted to the sub-pixels of the region in the test picture in which the gray-scale to be adjusted is displayed, such that the variance between the color coordinate of the gray-scale to be adjusted and the gray-scale color coordinate of the region is minimized and the brightness corresponding to the region in the test picture in which the gray-scale to be adjusted is displayed is higher than the predetermined brightness comprises:

when $M'-M>0$ and $N'-N>0$:
adjusting the data signal inputted to the red sub-pixels to decrease the display proportion of the red sub-pixels in the region in the test picture in which the gray-scale to be adjusted is displayed, such that an abscissa, $M'$, of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the green sub-pixels to decrease the display proportion of the red sub-pixels in the region in the test picture in which the gray-scale to be adjusted is displayed, such that an ordinate, $N'$, of the color coordinate of the gray-scale to be adjusted results in a minimum value of $(N'-N)^2$ and that the brightness corresponding to the color coordinate of the gray-scale to be adjusted is higher than the predetermined brightness, when $M'-M<0$ and $N'-N<0$:
adjusting the data signal inputted to the blue sub-pixels to decrease the display proportion of the blue sub-pixels in the region in the test picture in which the gray-scale to be adjusted is displayed, such that the abscissa, $M'$, of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the green sub-pixels to decrease the display proportion of the red sub-pixels in the region in the test picture in which the gray-scale to be adjusted is displayed, such that the ordinate, $N'$, of the color coordinate of the gray-scale to be adjusted results in a minimum value of $(N'-N)^2$ and that the brightness corresponding to the color coordinate of the gray-scale to be adjusted is higher than the predetermined brightness, when $M'-M>0$ and $N'-N<0$:
adjusting the data signal inputted to the blue sub-pixels to decrease the display proportion of the blue sub-pixels in the region in the test picture in which the gray-scale to be adjusted is displayed, such that a difference between the ordinate of the color coordinate of the gray-scale to be adjusted and the ordinate of the color coordinate of the region is smaller than the third predetermined threshold and that the brightness corresponding to the color coordinate of the gray-scale to be adjusted is higher than the predetermined brightness;

adjusting the data signal inputted to the red sub-pixels to decrease the display proportion of the red sub-pixels in the region in the test picture in which the gray-scale to be adjusted is displayed, such that the abscissa, $M'$, of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the blue sub-pixels to increase the display proportion of the blue sub-pixels in the region in the test picture in which the gray-scale to be adjusted is displayed, such that the ordinate, $N'$, of the color coordinate of the gray-scale to be adjusted results in a minimum value of $(N'-N)^2$ and that the brightness corresponding to the color coordinate of the gray-scale to be adjusted is higher than the predetermined brightness, when $M'-M<0$ and $N'-N>0$:
adjusting the data signal inputted to the blue sub-pixels to decrease the display proportion of the blue sub-pixels in the region in the test picture in which the gray-scale to be adjusted is displayed, such that a difference between the ordinate of the color coordinate of the gray-scale to be adjusted and the ordinate of the color coordinate of the region is smaller than the third predetermined threshold and that the brightness corresponding to the color coordinate of the gray-scale to be adjusted is higher than the predetermined brightness;

adjusting the data signal inputted to the green sub-pixels to decrease the display proportion of the green sub-pixels in the region in the test picture in which the gray-scale to be adjusted is displayed, such that the abscissa, $M'$, of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the blue sub-pixels to increase the display proportion of the blue sub-pixels in the region in the test picture in which the gray-scale to be adjusted is displayed, such that the ordinate, $N'$, of the color coordinate of the gray-scale to be adjusted results in a minimum value of $(N'-N)^2$ and that the brightness corresponding to the color coordinate of the gray-scale to be adjusted is higher than the predetermined brightness, where $(M, N)$ represents the gray-scale color coordinate of the region in the test picture and $(M', N')$ represents the gray-scale color coordinate of the gray-scale to be adjusted.

According to another embodiment of the present disclosure, an apparatus for adjusting gray-scale chromatic aberration for a display panel is provided. The apparatus comprises: a signal input unit, configured to input a data signal of a test picture to sub-pixels of the display panel, for causing the display panel to display the test picture; an optical parameter collection unit configured to collect optical parameters of respective regions in the test picture; a comparison unit configured to compare the optical parameter of each region in the test picture with an optical parameter of a standard picture; and an adjustment unit configured to adjust the data signal inputted to the sub-pixels, such that a difference between the optical parameter of each region in the test picture and the optical parameter of the standard picture falls within a predetermined range. The optical parameter comprises a color coordinate and its corresponding brightness.

According to yet another embodiment of the present disclosure, a display device is provided. The display device comprises the above apparatus for adjusting gray-scale chromatic aberration for a display panel.

BRIEF DESCRIPTION OF THE DRAWINGS

The features and advantages of the present disclosure will become more apparent with reference to the figures. The figures are illustrative only, rather than limiting the present disclosure, in which:

FIG. 3 shows a process flow for adjusting gray-scale chromatic aberration for a display panel with respect to a white picture according to an embodiment of the present disclosure;

FIG. 5A and FIG. 5B show a process flow for adjusting chromatic aberration of respective gray-scales for a display panel with respect to a white balance picture according to an embodiment of the present disclosure;

FIG. 6A and FIG. 6B show a process flow for adjusting chromatic aberration of respective gray-scales for a display panel with respect to adjacent gray-scales according to an embodiment of the present disclosure;

DETAILED DESCRIPTION OF THE EMBODIMENTS

Gamma curves reflect the relationship between gray-scales and brightness, which is typically non-linear. In the field of LCD, there are various gamma curves. Different gamma curves are suitable for different environments. For example, a gamma curve having a gamma value of 2.2 is typically a curve consistent with characteristics of human eyes. A gamma curve having another gamma value can be selected in a brighter environment. With the continuous development of display technology, display panels have become increasingly popular, especially in small-size electronic devices such as mobile phones. Therefore, the requirements on optical characteristics of the display panels become higher and higher.

The embodiments of the present disclosure will be described in detail below with reference to the figures.

Figure 1:
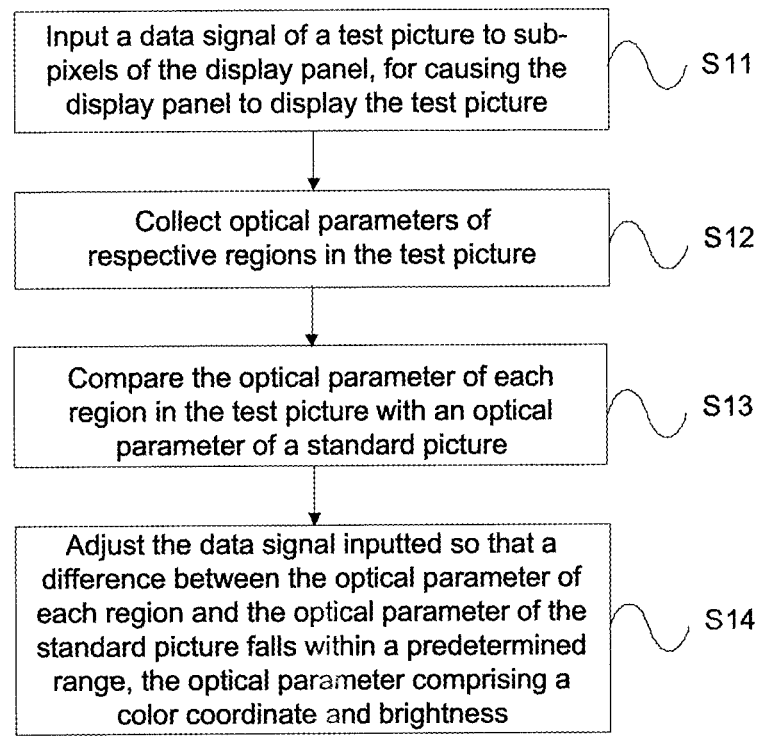
FIG. 1 is a flowchart illustrating a method for adjusting gray-scale chromatic aberration for a display panel according to an embodiment of the present disclosure.

FIG. 1 is a flowchart illustrating a method for adjusting gray-scale chromatic aberration for a display panel according to an embodiment of the present disclosure. As shown in FIG. 1, the method for adjusting gray-scale chromatic aberration for a display panel according to this embodiment includes the following steps.

At S11, a data signal of a test picture is inputted to sub-pixels of the display panel, for causing the display panel to display the test picture.

At S12, optical parameters of respective regions in the test picture are collected.

At S13, the optical parameter of each region in the test picture is compared with an optical parameter of a standard picture.

At S14, the data signal inputted to the sub-pixels is adjusted, such that a difference between the optical parameter of each region in the test picture and the optical parameter of the standard picture falls within a predetermined range.

Here, the optical parameter comprises a color coordinate and its corresponding brightness.

Figure 2:
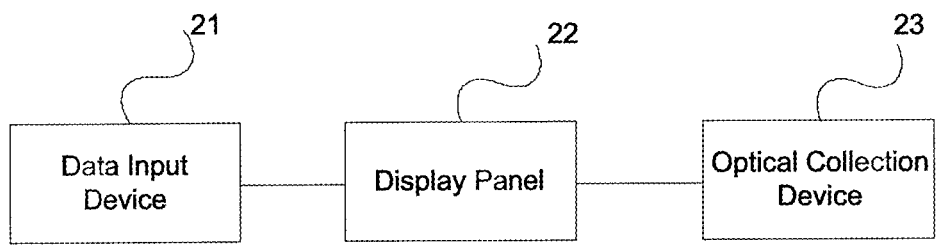
FIG. 2 shows a principle of a method for adjusting gray-scale chromatic aberration for a display panel according to an embodiment of the present disclosure.

In practice, a system as shown in FIG. 2 can be used for adjusting gray-scale chromatic aberration. In particular, in order to adjust gray-scale chromatic aberration for a display panel 22, a data input device inputs a data signal of a test picture to sub-pixels of the display panel 22, for causing the display panel 22 to display the test picture. An optical collection device 23 collects optical parameters of respective regions in the test picture. Each optical parameter includes a color coordinate and its corresponding brightness. Optimization software in the data input device 21 compares the optical parameter of each region in the test picture with an optical parameter of a standard picture and adjusts the data signal for the sub-pixels, such that a difference between the optical parameter of each region in the test picture and the optical parameter of the standard picture falls within a predetermined range. With the method for adjusting gray-scale chromatic aberration for the display panel according to the present disclosure, the image parameters of the display panel can be modified. After the adjustment and test for each display panel has completed, the data input device 21 writes the modified parameters into a control chip of the display panel. A display image can be modified into a normal state by applying the modified image parameters in the control chip, such that the gray-scale chromatic aberration for the display panel can be adjusted.

It is to be noted that the optical parameters for the display panel need to operate for a while before they can be stable. Hence, in order to ensure the accuracy of the collected optical parameters, the method for adjusting gray-scale chromatic aberration for the display panel according to the embodiment of the present disclosure can be performed after the display panel has operated for a predetermined time period.

With the method for adjusting gray-scale chromatic aberration for the display panel according to the embodiment of the present disclosure, by comparing the optical parameter of each region in the test picture with the optical parameter of the standard picture, the data signal inputted to the sub-pixels can be automatically adjusted, such that the difference between the optical parameter of each region in the test picture and the optical parameter of the standard picture can be within a predetermined range. In this way, the gray-scale chromatic aberration can be automatically reduced based on color coordinates, such that the problem associated with inefficient and error-prone manual adjustments can be avoided and the efficiency of adjustment of the display panel can be improved.

For example, the display panel includes n*n regions, where n is an integer larger than 1. In the process for adjusting the gray-scale chromatic aberration for the display panel, different gray-scales can be displayed in the respective regions.

For example, in order to adjust the gray-scale chromatic aberration for the display panel with respect to a white picture, a white picture can be displayed in all the regions in the display panel and the standard picture can be a white balance picture.

In this case, the step of adjusting the data signal inputted to the sub-pixels such that the difference between the optical parameter of each region in the test picture and the optical parameter of the standard picture falls within the predetermined range includes:

comparing the color coordinates of the respective regions in the test picture with the color coordinates of the standard picture sequentially;

adjusting, when a difference between the color coordinate of any region in the test picture and the color coordinate of the standard picture has an absolute value larger than 0, the data signal inputted to the sub-pixels of the region, such that a difference between the color coordinate of the region and the color coordinate of the standard picture is smaller than a first predetermined threshold and the brightness corresponding to the color coordinate of the region is higher than a predetermined brightness; and terminating the adjustment when a difference between the color coordinate of at least one region in the test picture and the color coordinate of the standard picture has an absolute value larger than the first predetermined threshold.

It is to be noted here that the first predetermined threshold is set depending on user requirements on the gray-scale chromatic aberration. When a difference between the color coordinate of at least one region in the test picture and the color coordinate of the standard picture has an absolute value larger than the first predetermined threshold after the adjustment, the adjustment of the gray-scale chromatic aberration for the display panel with respect to the white picture has failed. In this case, the adjustment can be terminated and the display panel can be discarded.

FIG. 3 shows a process flow for adjusting gray-scale chromatic aberration for a display panel with respect to a white picture according to an embodiment of the present disclosure. As shown in FIG. 3, the step of adjusting the data signal inputted to the sub-pixels of the region, so as to adjust the color coordinate of the region, includes:

when X-X'>0 and Y-Y'>0:
   adjusting the data signal inputted to red sub-pixels to decrease a display proportion of the red sub-pixels in the region, such that X-X' for the region is smaller than a second predetermined threshold; and
   adjusting the data signal inputted to green sub-pixels to decrease a display proportion of the green sub-pixels in the region, such that Y-Y' for the region is smaller than the second predetermined threshold,
when X-X'<0 and Y-Y'<0:
   adjusting the data signal inputted to blue sub-pixels to decrease a display proportion of the blue sub-pixels in the region, such that X-X' for the region is smaller than the second predetermined threshold after the adjustment; and
   adjusting the data signal inputted to the green sub-pixels to decrease the display proportion of the green sub-pixels in the region, such that Y-Y' for the region is smaller than the second predetermined threshold,
when X-X'>0 and Y-Y'<0:
   adjusting the data signal inputted to the blue sub-pixels to decrease the display proportion of the blue sub-pixels in the region, such that Y-Y' for the region is smaller than a third predetermined threshold after the adjustment;
   adjusting the data signal inputted to the red sub-pixels to decrease the display proportion of the red sub-pixels in the region, such that X-X' for the region is smaller than a second predetermined threshold; and
   adjusting the data signal inputted to the blue sub-pixels to increase the display proportion of the blue sub-pixels in the region, such that X-X' for the region is smaller than the second predetermined threshold,
when X-X'<0 and Y-Y'>0:
   adjusting the data signal inputted to the blue sub-pixels to decrease the display proportion of the blue sub-pixels in the region, such that X-X' for the region is smaller than the third predetermined threshold;
   adjusting the data signal inputted to the green sub-pixels to decrease the display proportion of the green sub-pixels in the region, such that Y-Y' for the region is smaller than a second predetermined threshold; and
   adjusting the data signal inputted to the blue sub-pixels to increase the display proportion of the blue sub-pixels in the region, such that X-X' for the region is smaller than the second predetermined threshold, where (X, Y) represents the color coordinate of the region in the test picture and (X', Y') represents the color coordinate of the standard picture.

The method for adjusting gray-scale chromatic aberration for the display panel can further include: adjusting, when the difference between the color coordinate of each region in the test picture and the color coordinate of the standard picture has an absolute value smaller than the first predetermined threshold, a gray-scale color coordinate of the test picture.

It is to be noted that, when the difference between the color coordinate of each region in the test picture and the color coordinate of the standard picture has an absolute value smaller than the first predetermined threshold, the adjustment of the gray-scale chromatic aberration for the display panel with respect to the white picture has succeeded. As the user requirements on optical performance of small-size display panels become increasingly strict, the gray-scale color coordinate of the display panel needs to be adjusted after the adjustment of the gray-scale chromatic aberration with respect to the white picture has succeeded.

In an embodiment of the present disclosure, the step of adjusting the gray-scale color coordinate of the test picture includes:

displaying the test picture at different gray-scales in the respective regions in the display panel;

comparing the gray-scale color coordinates of the respective regions in the test picture with the color coordinates of the standard picture sequentially; and adjusting, when a difference between the gray-scale color coordinate of any region in the test picture and the color coordinate of the standard picture has an absolute value larger than 0, the data signal inputted to the sub-pixels of the region, such that the variance between the gray-scale color coordinate of the region and the color coordinate of the standard picture is minimized and the brightness corresponding to the gray-scale color coordinate of the region is higher than the predetermined brightness.

It is to be noted here that, after the adjustment of the gray-scale chromatic aberration for the display panel with respect to the white picture has succeeded, it is required to adjust the chromatic aberrations of the respective gray-scales in the display panel with respect to a standard white balance picture. In the process for adjusting the chromatic aberrations of the respective gray-scales with respect to the standard white balance picture, a test picture having n*n different gray-scales can be used. For example, a test picture shown in FIG. 4 can be displayed on the display panel. Sixteen levels of gray-scales can be adjusted using one single test picture. In this way, the efficiency in adjusting the gray-scale chromatic aberration can be further improved.

FIG. 5A and FIG. 5B show a process flow for adjusting chromatic aberration of respective gray-scales for a display panel with respect to a white balance picture according to an embodiment of the present disclosure. As shown in FIG. 5A and FIG. 5B, the step of adjusting the data signal inputted to the sub-pixels of the region such that the variance between the gray-scale color coordinate of the region and the color coordinate of the standard picture is minimized and the brightness corresponding to the gray-scale color coordinate of the region is higher than the predetermined brightness includes:

when M-X'>0 and N-Y'>0:
adjusting the data signal inputted to the red sub-pixels to decrease the display proportion of the red sub-pixels in the region, such that an abscissa, M, of the gray-scale color coordinate of the region results in a minimum value of $(M-X')^2$ and that the brightness corresponding to the gray-scale color coordinate of the region is higher than the predetermined brightness; and adjusting the data signal inputted to the green sub-pixels to decrease the display proportion of the green sub-pixels in the region, such that an ordinate, N, of the gray-scale color coordinate of the region results in a minimum value of $(N-Y')^2$ and that the brightness corresponding to the gray-scale color coordinate of the region is higher than the predetermined brightness, when M-X'<0 and N-Y'<0:
adjusting the data signal inputted to the blue sub-pixels to decrease the display proportion of the blue sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness; and adjusting the data signal inputted to the green sub-pixels to decrease the display proportion of the green sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness, when M-X'>0 and N-Y'<0:
adjusting the data signal inputted to the blue sub-pixels to decrease the display proportion of the blue sub-pixels in the region, such that a difference between the ordinate of the gray-scale color coordinate of the region and the ordinate of the color coordinate of the standard picture is smaller than the third predetermined threshold and that the brightness corresponding to the gray-scale color coordinate of the region is higher than the predetermined brightness;

adjusting the data signal inputted to the red sub-pixels to decrease the display proportion of the red sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness; and adjusting the data signal inputted to the blue sub-pixels to increase the display proportion of the blue sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness, when M-X'<0 and N-Y'>0:
adjusting the data signal inputted to the blue sub-pixels to decrease the display proportion of the blue sub-pixels in the region, such that a difference between the abscissa of the gray-scale color coordinate of the region and the abscissa of the color coordinate of the standard picture is smaller than the third predetermined threshold and that the brightness corresponding to the gray-scale color coordinate of the region is higher than the predetermined brightness;

adjusting the data signal inputted to the green sub-pixels to decrease the display proportion of the green sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness; and adjusting the data signal inputted to the blue sub-pixels to increase the display proportion of the blue sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness, where (M, N) represents the gray-scale color coordinate of the region in the test picture and (X', Y') represents the color coordinate of the standard picture.

The step of adjusting the gray-scale color coordinates of the respective regions in the test picture can further include:

displaying the test picture at continuous gray-scales in the respective regions in the display panel;

comparing the gray-scale color coordinate of one of the regions in the test picture with predetermined adjacent, continuous color coordinates sequentially;

determining a gray-scale to be adjusted, the gray-scale to be adjusted having a maximum absolute difference from the gray-scale color coordinate of the region among the predetermined adjacent, continuous color coordinates; and adjusting, when a difference between the color coordinate of the gray-scale to be adjusted and the gray-scale color coordinate of the region has an absolute value larger than 0, the data signal inputted to the sub-pixels of the region in the test picture in which the gray-scale to be adjusted is displayed, such that the variance between the color coordinate of the gray-scale to be adjusted and the gray-scale color coordinate of the region is minimized and the brightness corresponding to the region in the test picture in which the gray-scale to be adjusted is displayed is higher than the predetermined brightness.

Figure 4:
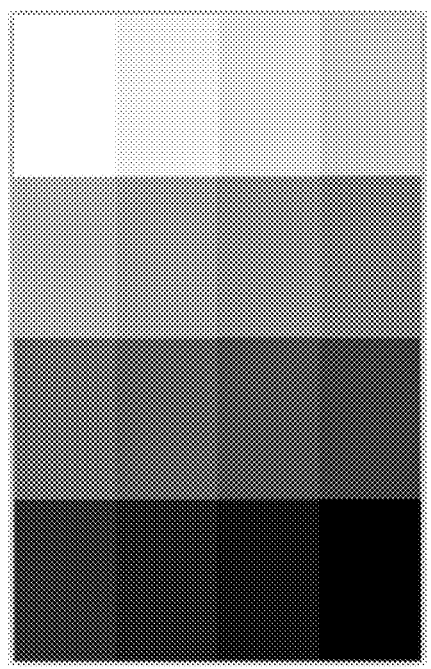
FIG. 4 is a schematic diagram showing a test picture having 4*4 different gray-scales according to an embodiment of the present disclosure.

For example, a gray-scale 255 is displayed in the region of the display panel, e.g., the region in the first row and first column among the 4*4 regions shown in FIG. 4. The color coordinate of the grays-scale 255 can be compared with color coordinates of 16 (the number of adjacent gray-scales whose color coordinates are to be compared can be set as desired) adjacent, continuous gray-scales (e.g., the gray-scales 254, 253, . . . , 240 as displayed in order in the remaining 15 regions shown in FIG. 4) sequentially, so as to find out a gray-scale (e.g., the gray-scale 240) with a color coordinate having a largest absolute difference from that of the gray-scale 255, as a gray-scale to be adjusted. The data signal inputted to the sub-pixels in the region in which the gray-scale 240 is displayed can be adjusted, such that the variance between the color coordinate of the gray-scale 240 and the color coordinate of the gray-scale 255 is minimized and the brightness corresponding to the region in which the gray-scale 240 is displayed is higher than the predetermined brightness. With this method, all other gray-scales 254, 253, . . . , 0 can be displayed in the region of the display panel sequentially and pictures having the adjacent gray-scales can be displayed in order in the remaining regions, such that the gray-scales to be adjusted corresponding to the respective gray-scales can be determined and the chromatic aberrations of the respective gray-scales and with respect to their adjacent gray-scales in the display panel can be adjusted.

It is to be noted here that, after the adjustment of the gray-scale chromatic aberration for the display panel with respect to the standard white balance picture has succeeded, it is required to adjust the chromatic aberrations between the respective gray-scales and their adjacent gray-scales in the display panel. In the process for adjusting the chromatic aberrations of the respective gray-scales with respect to their adjacent gray-scales, a test picture having n*n different gray-scales can be used. For example, a test picture shown in FIG. 3 can be displayed on the display panel, such that sixteen levels of gray-scales can be adjusted using one test picture having 4*4 different gray-scales. In this way, the efficiency in adjusting the gray-scale chromatic aberration can be further improved. By adjusting sixteen levels of gray-scales simultaneously, the efficiency in adjusting the gray-scale chromatic aberration can be improved when compared with adjusting and testing one gray-scale at a time. It can be appreciated by those skilled in the art that the present disclosure is not limited to the above example and other numbers, e.g., 3*3 or 8*8, of levels of gray-scales can be tested at the same time.

FIG. 6A and FIG. 6B show a process flow for adjusting chromatic aberration of respective gray-scales for a display panel with respect to adjacent gray-scales according to an embodiment of the present disclosure. As shown in FIG. 6A and FIG. 6B, the step of adjusting the data signal inputted to the sub-pixels of the region in the test picture in which the gray-scale to be adjusted is displayed, such that the variance between the color coordinate of the gray-scale to be adjusted and the gray-scale color coordinate of the region is minimized and the brightness corresponding to the region in the test picture in which the gray-scale to be adjusted is displayed is higher than the predetermined brightness includes:

when M'-M>0 and N'-N>0:
adjusting the data signal inputted to the red sub-pixels to decrease the display proportion of the red sub-pixels in the region in the test picture in which the gray-scale to be adjusted is displayed, such that an abscissa, M', of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the green sub-pixels to decrease the display proportion of the red sub-pixels in the region in the test picture in which the gray-scale to be adjusted is displayed, such that an ordinate, N', of the color coordinate of the gray-scale to be adjusted results in a minimum value of $(N'-N)^2$ and that the brightness corresponding to the color coordinate of the gray-scale to be adjusted is higher than the predetermined brightness, when M'-M<0 and N'-N<0:
adjusting the data signal inputted to the blue sub-pixels to decrease the display proportion of the blue sub-pixels in the region in the test picture in which the gray-scale to be adjusted is displayed, such that the abscissa, M', of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the green sub-pixels to decrease the display proportion of the red sub-pixels in the region in the test picture in which the gray-scale to be adjusted is displayed, such that the ordinate, N', of the color coordinate of the gray-scale to be adjusted results in a minimum value of $(N'-N)^2$ and that the brightness corresponding to the color coordinate of the gray-scale to be adjusted is higher than the predetermined brightness, when M'-M>0 and N'-N<0:
adjusting the data signal inputted to the blue sub-pixels to decrease the display proportion of the blue sub-pixels in the region in the test picture in which the gray-scale to be adjusted is displayed, such that a difference between the ordinate of the color coordinate of the gray-scale to be adjusted and the ordinate of the color coordinate of the region is smaller than the third predetermined threshold and that the brightness corresponding to the color coordinate of the gray-scale to be adjusted is higher than the predetermined brightness;

adjusting the data signal inputted to the red sub-pixels to decrease the display proportion of the red sub-pixels in the region in the test picture in which the gray-scale to be adjusted is displayed, such that the abscissa, M', of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the blue sub-pixels to increase the display proportion of the blue sub-pixels in the region in the test picture in which the gray-scale to be adjusted is displayed, such that the ordinate, N', of the color coordinate of the gray-scale to be adjusted results in a minimum value of $(N'-N)^2$ and that the brightness corresponding to the color coordinate of the gray-scale to be adjusted is higher than the predetermined brightness, when M'-M<0 and N'-N>0:
adjusting the data signal inputted to the blue sub-pixels to decrease the display proportion of the blue sub-pixels in the region in the test picture in which the gray-scale to be adjusted is displayed, such that a difference between the ordinate of the color coordinate of the gray-scale to be adjusted and the ordinate of the color coordinate of the region is smaller than the third predetermined threshold and that the brightness corresponding to the color coordinate of the gray-scale to be adjusted is higher than the predetermined brightness;

adjusting the data signal inputted to the green sub-pixels to decrease the display proportion of the green sub-pixels in the region in the test picture in which the gray-scale to be adjusted is displayed, such that the abscissa, M', of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the blue sub-pixels to increase the display proportion of the blue sub-pixels in the region in the test picture in which the gray-scale to be adjusted is displayed, such that the ordinate, N', of the color coordinate of the gray-scale to be adjusted results in a minimum value of $(N'-N)^2$ and that the brightness corresponding to the color coordinate of the gray-scale to be adjusted is higher than the predetermined brightness, where (M, N) represents the gray-scale color coordinate of the region in the test picture and (M', N') represents the gray-scale color coordinate of the gray-scale to be adjusted.

It is to be noted here that the second predetermined threshold and the third predetermined threshold can be set depending on user requirements. For example, the second predetermined threshold can be set as 0.001 and the third predetermined threshold can be set as 0.005. Further, the predetermined brightness can be a minimum brightness required by the user. In the method for adjusting gray-scale chromatic aberration for the display panel according to the embodiment of the present disclosure, the adjustment of the gray-scale color coordinate has an impact on the brightness corresponding to the gray-scale color coordinate. Hence, in order to guarantee that the adjusted display panel can provide the minimum brightness required by the user, the brightness corresponding to the gray-scale color coordinate should be higher than the predetermined brightness while the gray-scale chromatic aberration is smaller than the predetermined threshold.

In practice, the color coordinates collected by the optical collection device 23 can be coordinate values in a CIE1931 color system. In order to adjust the chromatic aberration of the respective gray-scales with respect to the standard white balance picture and with respect to their adjacent gray-scales, it is required to convert the coordinate values in the CIE1931 color system into coordinate values in a CIE1976 color system before adjusting the gray-scale chromatic aberration, such that the color coordinates can meet the threshold requirements. In the CIE1976 color system, colors are represented in two dimensions U' and V'. In particular, a collected coordinate value in the CIE1931 color system can be converted into a coordinate value in the CIE1976 color system according to the following conversion equation (1):

$$U'_i = \frac{4 \times x_i}{-2 \times x_i + 12 \times y_i + 3}, \quad (1)$$

$$V'_i = \frac{9 \times y_i}{-2 \times x_i + 12 \times y_i + 3}$$

where $U'_i$ denotes the abscissa of the i-th gray-scale in the CIE1976 color coordinate, $V'_i$ denotes the ordinate of the i-th gray-scale in the CIE1976 color coordinate, $x_i$ denotes the abscissa of the i-th gray-scale in the CIE1931 color coordinate, and $y_i$ denotes the ordinate of the i-th gray-scale in the CIE1931 color coordinate.

In the method for adjusting gray-scale chromatic aberration for the display panel according to the embodiment of the present disclosure, the data signal inputted to the sub-pixels can be adjusted by adjusting data voltages for the sub-pixels. The data voltages for the sub-pixels can be adjusted by adjusting gamma registers corresponding to the sub-pixels. For example, the data signal inputted to the red sub-pixels can be adjusted to decrease the display proportion of the red sub-pixels in the region by adjusting the values in the gamma registers corresponding to the red sub-pixels. For example, the step can be set to 2 and the values of the gamma registers can be decreased one step at a time. In this way, the data signal inputted to the red sub-pixels can be adjusted to decrease the display proportion of the red sub-pixels in the region.

Figure 7:
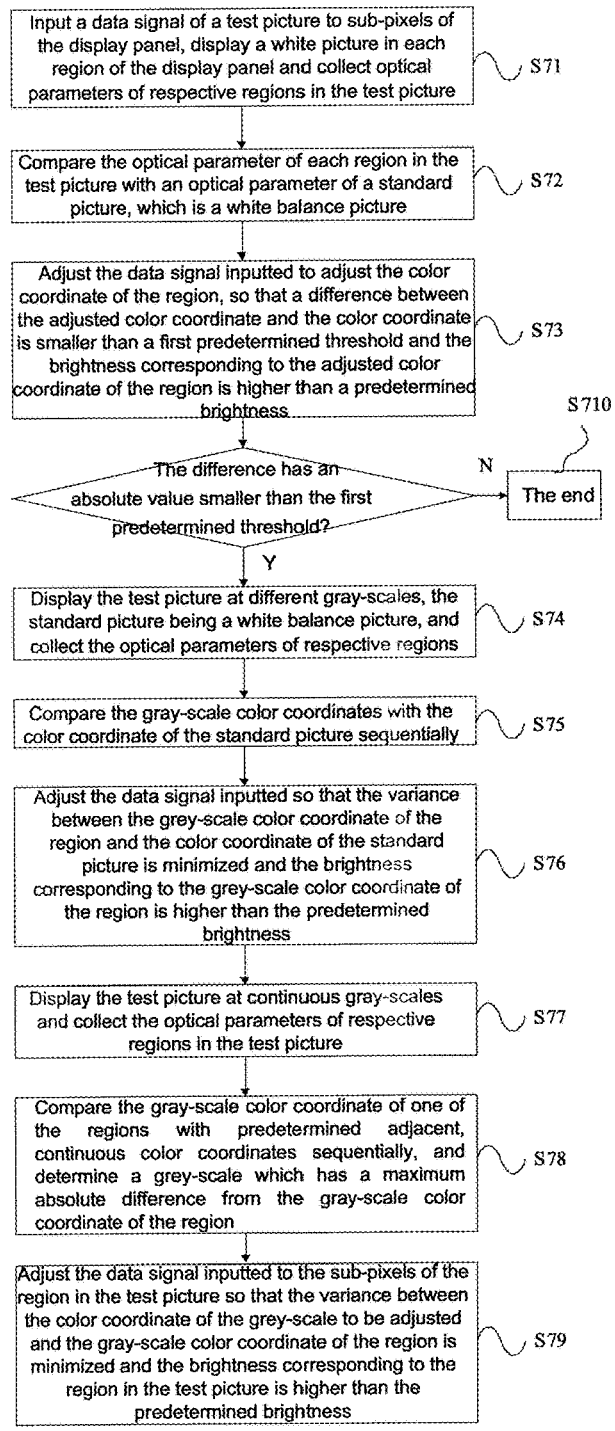
FIG. 7 is a flowchart illustrating a method for adjusting gray-scale chromatic aberration for a display panel according to another embodiment of the present disclosure.

FIG. 7 is a flowchart illustrating a method for adjusting gray-scale chromatic aberration for a display panel according to another embodiment of the present disclosure. As shown in FIG. 7, the method for adjusting gray-scale chromatic aberration for a display panel in this embodiment includes the following steps.

At step S71, a data signal of a test picture is inputted to sub-pixels of the display panel. A white picture is displayed in each region of the display panel. Optical parameters of respective regions in the test picture are collected.

At step S72, the optical parameter of each region in the test picture is compared with an optical parameter of a standard picture. The standard picture can be a white balance picture.

At step S73, when a difference between the color coordinate of any region in the test picture and the color coordinate of the standard picture has an absolute value larger than 0, the data signal inputted to the sub-pixels of the region is adjusted to adjust the color coordinate of the region, such that a difference between the adjusted color coordinate of the region and the color coordinate of the standard picture is smaller than a first predetermined threshold and the brightness corresponding to the adjusted color coordinate of the region is higher than a predetermined brightness.

At step S74, when the difference between the adjusted color coordinate of each region in the test picture and the color coordinate of the standard picture has an absolute value smaller than the first predetermined threshold, the test picture is displayed at different gray-scales in the respective regions in the display panel. The standard picture can be a white balance picture. The optical parameters of respective regions in the test picture are collected.

At step S75, the gray-scale color coordinates of the respective regions in the test picture are compared with the color coordinates of the standard picture sequentially.

At step S76, when a difference between the gray-scale color coordinate of any region in the test picture and the color coordinate of the standard picture has an absolute value larger than 0, the data signal inputted to the sub-pixels of the region is adjusted, such that the variance between the gray-scale color coordinate of the region and the color coordinate of the standard picture is minimized and the brightness corresponding to the gray-scale color coordinate of the region is higher than the predetermined brightness.

At step S77, the test picture is displayed at continuous gray-scales in the respective regions in the display panel. The optical parameters of respective regions in the test picture are collected.

At step S78, the gray-scale color coordinate of one of the regions in the test picture is compared with predetermined adjacent, continuous color coordinates sequentially, and a gray-scale to be adjusted is determined, which has a maximum absolute difference from the gray-scale color coordinate of the region among the predetermined adjacent, continuous color coordinates.

At step S79, when a difference between the color coordinate of the gray-scale to be adjusted and the gray-scale color coordinate of the region has an absolute value larger than 0, the data signal inputted to the sub-pixels of the region in the test picture in which the gray-scale to be adjusted is displayed is adjusted, such that the variance between the color coordinate of the gray-scale to be adjusted and the gray-scale color coordinate of the region is minimized and the brightness corresponding to the region in the test picture in which the gray-scale to be adjusted is displayed is higher than the predetermined brightness.

At step S710, when a difference between the color coordinate of at least one region in the test picture and the color coordinate of the standard picture has an absolute value larger than the first predetermined threshold, the adjustment is terminated.

With the method for adjusting gray-scale chromatic aberration for the display panel according to the embodiment of the present disclosure, by comparing the optical parameter of each region in the test picture with the optical parameter of the standard picture, the data signal inputted to the sub-pixels can be automatically adjusted, such that the difference between the optical parameter of each region in the test picture and the optical parameter of the standard picture can be within a predetermined range. In this way, the gray-scale chromatic aberration can be automatically reduced based on color coordinates, such that the problem associated with inefficient and error-prone manual adjustments can be avoided and the efficiency of adjustment of the display panel can be improved. With the method for adjusting gray-scale chromatic aberration for the display panel according to the present disclosure, the image parameters of the display panel can be modified. After the adjustment and test for each display panel has completed, the modified parameters can be written into a control chip of the display panel. A display image can be modified into a normal state by applying the modified image parameters in the control chip.

Figure 8:
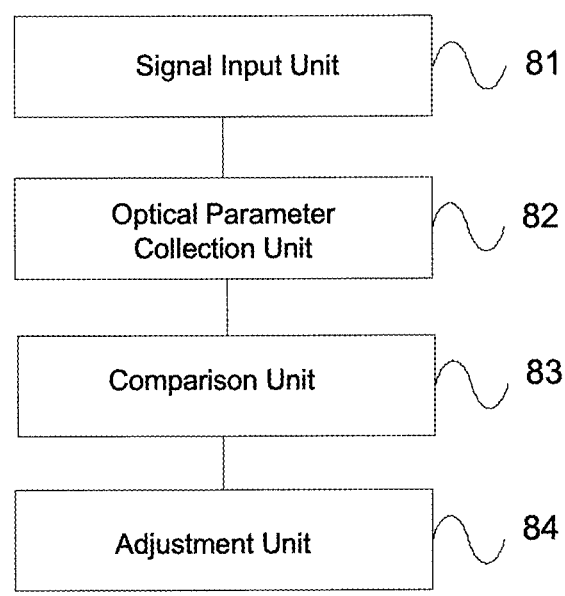
FIG. 8 is a schematic diagram showing a structure of an apparatus for adjusting gray-scale chromatic aberration for a display panel according to an embodiment of the present disclosure.

FIG. 8 is a schematic diagram showing a structure of an apparatus for adjusting gray-scale chromatic aberration for a display panel according to an embodiment of the present disclosure. As shown in FIG. 8, the apparatus for adjusting gray-scale chromatic aberration for the display panel according to an embodiment of the present disclosure includes a signal input unit 81, an optical parameter collection unit 82, a comparison unit 83 and an adjustment unit 84.

The signal input unit 81 is configured to input a data signal of a test picture to sub-pixels of the display panel, for causing the display panel to display the test picture. The optical parameter collection unit 82 is configured to collect optical parameters of respective regions in the test picture. The comparison unit 83 is configured to compare the optical parameter of each region in the test picture with an optical parameter of a standard picture. The adjustment unit 84 is configured to adjust the data signal inputted to the sub-pixels, such that a difference between the optical parameter of each region in the test picture and the optical parameter of the standard picture falls within a predetermined range. Here, the optical parameter includes a color coordinate and its corresponding brightness.

The apparatus for adjusting gray-scale chromatic aberration for the display panel according to the embodiment of the present disclosure can implement the above method embodiments. Their principles and technical effects are similar and details thereof will be omitted here.

With the apparatus for adjusting gray-scale chromatic aberration for the display panel according to the embodiment of the present disclosure, by comparing the optical parameter of each region in the test picture with the optical parameter of the standard picture, the data signal inputted to the sub-pixels can be automatically adjusted, such that the difference between the optical parameter of each region in the test picture and the optical parameter of the standard picture can be within a predetermined range. In this way, the gray-scale chromatic aberration can be automatically reduced based on color coordinates, such that the problem associated with inefficient and error-prone manual adjustments can be avoided and the efficiency of adjustment of the display panel can be improved.

Furthermore, those skilled in the art will recognize that one or more processors and one or more storage devices can be used to implement the apparatus for adjusting gray-scale chromatic aberration for the display panel according to the embodiment of the present disclosure. Instructions may be stored on the storage devices so that when the instructions are executed by the processors, the processors may input a data signal of a test picture to sub-pixels of the display panel, for causing the display panel to display the test picture; collect optical parameters of respective regions in the test picture; compare the optical parameter of each region in the test picture with an optical parameter of a standard picture; and adjust the data signal inputted to the sub-pixels, such that a difference between the optical parameter of each region in the test picture and the optical parameter of the standard picture falls within a predetermined range, and the optical parameter comprises a color coordinate and its corresponding brightness.

According to an embodiment of the present disclosure, a display device is provided. The display device includes the apparatus for adjusting gray-scale chromatic aberration for the display panel as described above.

With the method and apparatus for adjusting gray-scale chromatic aberration for the display panel as well as the display device according to the embodiments of the present disclosure, by comparing the optical parameter of each region in the test picture with the optical parameter of the standard picture, the data signal inputted to the sub-pixels can be automatically adjusted, such that the difference between the optical parameter of each region in the test picture and the optical parameter of the standard picture can be within a predetermined range. In this way, the gray-scale chromatic aberration can be automatically reduced based on color coordinates, such that the problem associated with inefficient and error-prone manual adjustments can be avoided and the efficiency of adjustment of the display panel can be improved.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically matable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for adjusting gray-scale chromatic aberration for a display panel, comprising:
    inputting a data signal of a test picture to sub-pixels of the display panel, for causing the display panel to display the test picture;
    collecting optical parameters of respective regions in the test picture;
    comparing the optical parameter of each region in the test picture with an optical parameter of a standard picture; and
    adjusting the data signal inputted to the sub-pixels such that a difference between the optical parameter of each region in the test picture and the optical parameter of the standard picture falls within a predetermined range,
    wherein the optical parameter comprises a color coordinate and its corresponding brightness;
    wherein the method further comprises adjusting a gray-scale color coordinate of the test picture in response to a difference between the color coordinate of each region in the test picture and the color coordinate of the standard picture has an absolute value smaller than a first predetermined threshold.

2. The adjusting method according to claim 1, wherein the display panel comprises n*n regions, where n is an integer larger than 1.

3. The adjusting method according to of claim 2, wherein the test picture is a white picture and the standard picture is a white balance picture, and said adjusting the data signal inputted to the sub-pixels such that the difference between the optical parameter of each region in the test picture and the optical parameter of the standard picture falls within the predetermined range comprises:
    comparing the color coordinates of the respective regions in the test picture with the color coordinates of the standard picture sequentially;
    adjusting, when a difference between the color coordinate of any region in the test picture and the color coordinate of the standard picture has an absolute value larger than 0, the data signal inputted to the sub-pixels of the region, such that a difference between the color coordinate of the region and the color coordinate of the standard picture is smaller than a first predetermined threshold and the brightness corresponding to the color coordinate of the region is higher than a predetermined brightness; and
    terminating the adjustment when a difference between the color coordinate of at least one region in the test picture and the color coordinate of the standard picture has an absolute value larger than the first predetermined threshold.

4. The adjusting method according to claim 3, wherein said adjusting the data signal inputted to the sub-pixels of the region comprises:
    when X-X'>0 and Y-Y'>0:
        adjusting the data signal inputted to red sub-pixels to decrease a display proportion of the red sub-pixels in the region, such that X-X' for the region is smaller than a second predetermined threshold; and
        adjusting the data signal inputted to green sub-pixels to decrease a display proportion of the green sub-pixels in the region, such that Y-Y' for the region is smaller than the second predetermined threshold,
    when X-X'<0 and Y-Y'<0:
        adjusting the data signal inputted to blue sub-pixels to decrease a display proportion of the blue sub-pixels in the region, such that X-X' for the region is smaller than the second predetermined threshold; and
        adjusting the data signal inputted to the green sub-pixels to decrease the display proportion of the green sub-pixels in the region, such that Y-Y' for the region is smaller than the second predetermined threshold,
    when X-X'>0 and Y-Y'<0:
        adjusting the data signal inputted to the blue sub-pixels to decrease the display proportion of the blue sub-pixels in the region, such that Y-Y' for the region is smaller than a third predetermined threshold;
        adjusting the data signal inputted to the red sub-pixels to decrease the display proportion of the red sub-pixels in the region, such that X-X' for the region is smaller than a second predetermined threshold; and
        adjusting the data signal inputted to the blue sub-pixels to increase the display proportion of the blue sub-pixels in the region, such that X-X' for the region is smaller than the second predetermined threshold,
    when X-X'<0 and Y-Y'>0:
        adjusting the data signal inputted to the blue sub-pixels to decrease the display proportion of the blue sub-pixels in the region, such that X-X' for the region is smaller than the third predetermined threshold;
        adjusting the data signal inputted to the green sub-pixels to decrease the display proportion of the green sub-pixels in the region, such that Y-Y' for the region is smaller than a second predetermined threshold; and
        adjusting the data signal inputted to the blue sub-pixels to increase the display proportion of the blue sub-pixels in the region, such that X-X' for the region is smaller than the second predetermined threshold,
    wherein (X, Y) represents the color coordinate of the region in the test picture and (X', Y') represents the color coordinate of the standard picture.

5. The adjusting method according to claim 4, further comprising:
    adjusting, when the difference between the color coordinate of each region in the test picture and the color coordinate of the standard picture has an absolute value smaller than the first predetermined threshold, a gray-scale color coordinate of the test picture.

6. The adjusting method according to claim 5, wherein said adjusting the gray-scale color coordinate of the test picture comprises:
    displaying the test picture at different gray-scales in the respective regions in the display panel;
    comparing the gray-scale color coordinates of the respective regions in the test picture with the color coordinates of the standard picture sequentially; and
    adjusting, when a difference between the gray-scale color coordinate of any region in the test picture and the color coordinate of the standard picture has an absolute value larger than 0, the data signal inputted to the sub-pixels of the region, such that the variance between the gray-scale color coordinate of the region and the color coordinate of the standard picture is minimized and the brightness corresponding to the gray-scale color coordinate of the region is higher than the predetermined brightness.

7. The adjusting method according to claim 6, wherein said adjusting the data signal inputted to the sub-pixels of the region such that the variance between the gray-scale color coordinate of the region and the color coordinate of the standard picture is minimized and the brightness corresponding to the gray-scale color coordinate of the region is higher than the predetermined brightness comprises:

when M-X'>0 and N-Y'>0:
  adjusting the data signal inputted to the red sub-pixels to decrease the display proportion of the red sub-pixels in the region, such that an abscissa, M, of the gray-scale color coordinate of the region results in a minimum value of $(M-X')^2$ and that the brightness corresponding to the gray-scale color coordinate of the region is higher than the predetermined brightness; and
  adjusting the data signal inputted to the green sub-pixels to decrease the display proportion of the green sub-pixels in the region, such that an ordinate, N, of the gray-scale color coordinate of the region results in a minimum value of $(N-Y')^2$ and that the brightness corresponding to the gray-scale color coordinate of the region is higher than the predetermined brightness, when M-X'<0 and N-Y'<0:
  adjusting the data signal inputted to the blue sub-pixels to decrease the display proportion of the blue sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness; and
  adjusting the data signal inputted to the green sub-pixels to decrease the display proportion of the green sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness, when M-X'>0 and N-Y'<0:
  adjusting the data signal inputted to the blue sub-pixels to decrease the display proportion of the blue sub-pixels in the region, such that a difference between the ordinate of the gray-scale color coordinate of the region and the ordinate of the color coordinate of the standard picture is smaller than the third predetermined threshold and that the brightness corresponding to the gray-scale color coordinate of the region is higher than the predetermined brightness;
  adjusting the data signal inputted to the red sub-pixels to decrease the display proportion of the red sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness; and
  adjusting the data signal inputted to the blue sub-pixels to increase the display proportion of the blue sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness, when M-X'<0 and N-Y'>0:
  adjusting the data signal inputted to the blue sub-pixels to decrease the display proportion of the blue sub-pixels in the region, such that a difference between the abscissa of the gray-scale color coordinate of the region and the abscissa of the color coordinate of the standard picture is smaller than the third predetermined threshold and that the brightness corresponding to the gray-scale color coordinate of the region is higher than the predetermined brightness;
  adjusting the data signal inputted to the green sub-pixels to decrease the display proportion of the green sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness; and
  adjusting the data signal inputted to the blue sub-pixels to increase the display proportion of the blue sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness, wherein (M, N) represents the gray-scale color coordinate of the region in the test picture and (X', Y') represents the color coordinate of the standard picture.

8. The adjusting method according to claim 1, wherein said adjusting the gray-scale color coordinate of the test picture comprises:
  displaying the test picture at different gray-scales respectively in the respective regions in the display panel;
  comparing the gray-scale color coordinates of the respective regions in the test picture with the color coordinates of the standard picture sequentially; and
  adjusting, when a difference between the gray-scale color coordinate of any region in the test picture and the color coordinate of the standard picture has an absolute value larger than 0, the data signal inputted to the sub-pixels of the region, such that the variance between the gray-scale color coordinate of the region and the color coordinate of the standard picture is minimized and the brightness corresponding to the gray-scale color coordinate of the region is higher than the predetermined brightness.

9. The adjusting method according to claim 8, wherein said adjusting the data signal inputted to the sub-pixels of the region such that the variance between the gray-scale color coordinate of the region and the color coordinate of the standard picture is minimized and the brightness corresponding to the gray-scale color coordinate of the region is higher than the predetermined brightness comprises:

when M-X'>0 and N-Y'>0:
  adjusting the data signal inputted to the red sub-pixels to decrease the display proportion of the red sub-pixels in the region, such that an abscissa, M, of the gray-scale color coordinate of the region results in a minimum value of $(M-X')^2$ and that the brightness corresponding to the gray-scale color coordinate of the region is higher than the predetermined brightness; and
  adjusting the data signal inputted to the green sub-pixels to decrease the display proportion of the green sub-pixels in the region, such that an ordinate, N, of the gray-scale color coordinate of the region results in a minimum value of $(N-Y')^2$ and that the brightness corresponding to the gray-scale color coordinate of the region is higher than the predetermined brightness, when $M-X'<0$ and $N-Y'<0$:
  adjusting the data signal inputted to the blue sub-pixels to decrease the display proportion of the blue sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness; and
  adjusting the data signal inputted to the green sub-pixels to decrease the display proportion of the green sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness, when $M-X'>0$ and $N-Y'<0$:
  adjusting the data signal inputted to the blue sub-pixels to decrease the display proportion of the blue sub-pixels in the region, such that a difference between the ordinate of the gray-scale color coordinate of the region and the ordinate of the color coordinate of the standard picture is smaller than the third predetermined threshold and that the brightness corresponding to the gray-scale color coordinate of the region is higher than the predetermined brightness;
  adjusting the data signal inputted to the red sub-pixels to decrease the display proportion of the red sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness; and
  adjusting the data signal inputted to the blue sub-pixels to increase the display proportion of the blue sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness, when $M-X'<0$ and $N-Y'>0$:
  adjusting the data signal inputted to the blue sub-pixels to decrease the display proportion of the blue sub-pixels in the region, such that a difference between the abscissa of the gray-scale color coordinate of the region and the abscissa of the color coordinate of the standard picture is smaller than the third predetermined threshold and that the brightness corresponding to the gray-scale color coordinate of the region is higher than the predetermined brightness;
  adjusting the data signal inputted to the green sub-pixels to decrease the display proportion of the green sub-pixels in the region, such that the ordinate, N, of the gray-scale color coordinate of the region results in a minimum value of $(N-Y')^2$ and that the brightness corresponding to the gray-scale color coordinate of the region is higher than the predetermined brightness; and
  adjusting the data signal inputted to the blue sub-pixels to increase the display proportion of the blue sub-pixels in the region, such that the abscissa, M, of the gray-scale color coordinate of the region results in a minimum value of $(M-X')^2$ and that the brightness corresponding to the gray-scale color coordinate of the region is higher than the predetermined brightness, wherein (M, N) represents the gray-scale color coordinate of the region in the test picture and (X', Y') represents the color coordinate of the standard picture.

10. The adjusting method according to claim 8, wherein said adjusting the gray-scale color coordinates of the respective regions in the test picture further comprises:
  displaying the test picture at continuous gray-scales respectively in the respective regions in the display panel;
  comparing the gray-scale color coordinate of one of the regions in the test picture with predetermined adjacent, continuous color coordinates sequentially;
  determining a gray-scale to be adjusted, the gray-scale to be adjusted having a maximum absolute difference from the gray-scale color coordinate of the region among the predetermined adjacent, continuous color coordinates; and
  adjusting, when a difference between the color coordinate of the gray-scale to be adjusted and the gray-scale color coordinate of the region has an absolute value larger than 0, the data signal inputted to the sub-pixels of the region in the test picture in which the gray-scale to be adjusted is displayed, such that the variance between the color coordinate of the gray-scale to be adjusted and the gray-scale color coordinate of the region is minimized and the brightness corresponding to the region in the test picture in which the gray-scale to be adjusted is displayed is higher than the predetermined brightness.

11. The adjusting method according to claim 10, wherein said adjusting the data signal inputted to the sub-pixels of the region in the test picture in which the gray-scale to be adjusted is displayed, such that the variance between the color coordinate of the gray-scale to be adjusted and the gray-scale color coordinate of the region is minimized and the brightness corresponding to the region in the test picture in which the gray-scale to be adjusted is displayed is higher than the predetermined brightness comprises:
  when $M'-M>0$ and $N'-N>0$:
    adjusting the data signal inputted to the red sub-pixels to decrease the display proportion of the red sub-pixels in the region in the test picture in which the gray-scale to be adjusted is displayed, such that an abscissa, M', of the color coordinate of the gray-scale to be adjusted results in a minimum value of $(M'-M)^2$ and that the brightness corresponding to the color coordinate of the gray-scale to be adjusted is higher than the predetermined brightness; and
    adjusting the data signal inputted to the green sub-pixels to decrease the display proportion of the red sub-pixels in the region in the test picture in which the gray-scale to be adjusted is displayed, such that an ordinate, N', of the color coordinate of the gray-scale to be adjusted results in a minimum value of $(N'-N)^2$ and that the brightness corresponding to the color coordinate of the gray-scale to be adjusted is higher than the predetermined brightness,
  when $M'-M<0$ and $N'-N<0$:
    adjusting the data signal inputted to the blue sub-pixels to decrease the display proportion of the blue sub-pixels in the region in the test picture in which the gray-scale to be adjusted is displayed, such that the abscissa, M', of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the green sub-pixels to decrease the display proportion of the red sub-pixels in the region in the test picture in which the gray-scale to be adjusted is displayed, such that the ordinate, N', of the color coordinate of the gray-scale to be adjusted results in a minimum value of $(N'-N)^2$ and that the brightness corresponding to the color coordinate of the gray-scale to be adjusted is higher than the predetermined brightness, when M'-M>0 and N'-N<0:

adjusting the data signal inputted to the blue sub-pixels to decrease the display proportion of the blue sub-pixels in the region in the test picture in which the gray-scale to be adjusted is displayed, such that a difference between the ordinate of the color coordinate of the gray-scale to be adjusted and the ordinate of the color coordinate of the region is smaller than the third predetermined threshold and that the brightness corresponding to the color coordinate of the gray-scale to be adjusted is higher than the predetermined brightness;

adjusting the data signal inputted to the red sub-pixels to decrease the display proportion of the red sub-pixels in the region in the test picture in which the gray-scale to be adjusted is displayed, such that the abscissa, M', of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the blue sub-pixels to increase the display proportion of the blue sub-pixels in the region in the test picture in which the gray-scale to be adjusted is displayed, such that the ordinate, N', of the color coordinate of the gray-scale to be adjusted results in a minimum value of $(N'-N)^2$ and that the brightness corresponding to the color coordinate of the gray-scale to be adjusted is higher than the predetermined brightness, when M'-M<0 and N'-N>0:

adjusting the data signal inputted to the blue sub-pixels to decrease the display proportion of the blue sub-pixels in the region in the test picture in which the gray-scale to be adjusted is displayed, such that a difference between the ordinate of the color coordinate of the gray-scale to be adjusted and the ordinate of the color coordinate of the region is smaller than the third predetermined threshold and that the brightness corresponding to the color coordinate of the gray-scale to be adjusted is higher than the predetermined brightness;

adjusting the data signal inputted to the green sub-pixels to decrease the display proportion of the green sub-pixels in the region in the test picture in which the gray-scale to be adjusted is displayed, such that the abscissa, M', of the color coordinate of the gray-scale to be adjusted results in a minimum value of $(M'-M)^2$ and that the brightness corresponding to the color coordinate of the gray-scale to be adjusted is higher than the predetermined brightness; and adjusting the data signal inputted to the blue sub-pixels to increase the display proportion of the blue sub-pixels in the region in the test picture in which the gray-scale to be adjusted is displayed, such that the ordinate, N', of the color coordinate of the gray-scale to be adjusted results in a minimum value of $(N'-N)^2$ and that the brightness corresponding to the color coordinate of the gray-scale to be adjusted is higher than the predetermined brightness, wherein (M, N) represents the gray-scale color coordinate of the region in the test picture and (M', N') represents the gray-scale color coordinate of the gray-scale to be adjusted.

12. An apparatus for adjusting gray-scale chromatic aberration for a display panel, comprising:

a storage storing instructions;

a processor configured to execute the instructions to:

input a data signal of a test picture to sub-pixels of the display panel, for causing the display panel to display the test picture;

collect optical parameters of respective regions in the test picture;

compare the optical parameter of each region in the test picture with an optical parameter of a standard picture; and adjust the data signal inputted to the sub-pixels, such that a difference between the optical parameter of each region in the test picture and the optical parameter of the standard picture falls within a predetermined range, wherein the optical parameter comprises a color coordinate and its corresponding brightness;

wherein the processor is further configured to execute the instructions to adjust a gray-scale color coordinate of the test picture, in response to a difference between the color coordinate of each region in the test picture and the color coordinate of the standard picture has an absolute value smaller than a first predetermined threshold.

13. A display device, comprising the apparatus for adjusting gray-scale chromatic aberration for a display panel according to claim 12.

* * * * *